E. F. W. ALEXANDERSON.
HIGH FREQUENCY ALTERNATOR.
APPLICATION FILED JUNE 22, 1915.
1,229,856.
Patented June 12, 1917.
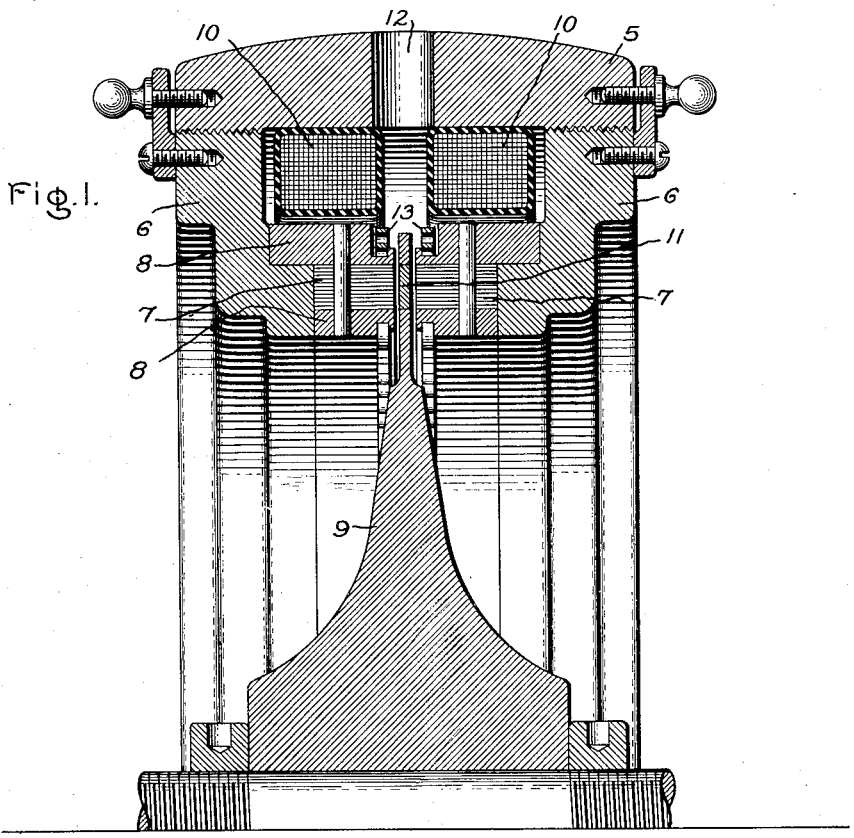
Fig. 1.
Fig. 3.
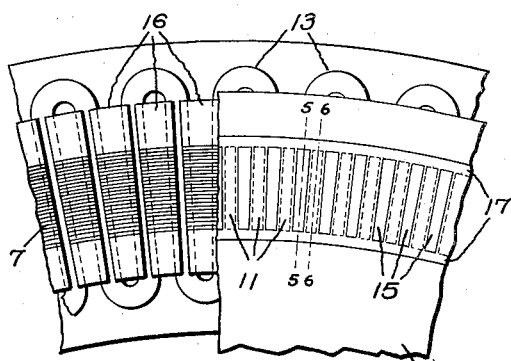
Fig. 2.
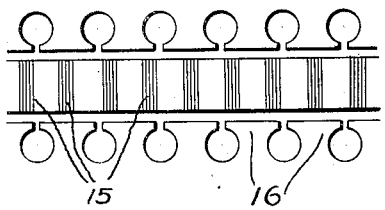
Fig. 4.
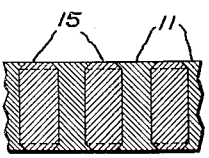
Fig. 5. Fig. 6.
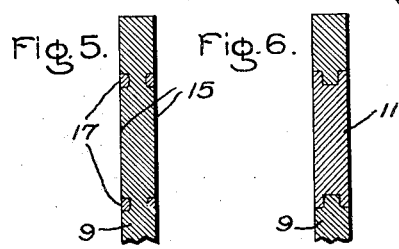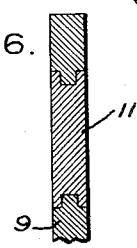
Inventor:
Ernst F. W. Alexanderson,
by Albert G. Davis
His Attorney.

UNITED STATES PATENT OFFICE.

ERNST F. W. ALEXANDERSON, OF SCHENECTADY, NEW YORK, ASSIGNOR TO GENERAL ELECTRIC COMPANY, A CORPORATION OF NEW YORK.

HIGH-FREQUENCY ALTERNATOR.

1,229,856.

Specification of Letters Patent. Patented June 12, 1917.

Application filed June 22, 1915. Serial No. 35,711.

*To all whom it may concern:*

Be it known that I, ERNST F. W. ALEXANDERSON, a citizen of the United States, residing in Schenectady, county of Schenectady, State of New York, have invented certain new and useful Improvements in High-Frequency Alternators, of which the following is a specification.

My invention relates to high frequency alternators and in particular to alternators adapted to directly generate alternating current of a frequency suitable for radio communication. The object of my invention is generally to improve the construction of high frequency inductor alternators, and, further, to provide a novel and improved alternator of this type. More particularly, the object of my invention is to provide a high frequency alternator of the inductor type having wider slots for the armature winding than has heretofore been possible in similar machines having corresponding characteristics of speed and frequency.

The continuous wave system of radio communication includes a source of high frequency alternating current delivering energy directly to the antenna. In my United States Letters Patent No. 1,008,577, Nov. 14, 1911, No. 1,110,029, Sept. 8, 1914, and No. 1,110,030, Sept. 8, 1914, I have described an inductor type of high frequency alternator particularly adapted to be used as the source of current in a continuous wave system of radio communication. This machine is of the inductor alternator type, and has a stationary laminated magnetic core carrying an armature winding for the induced high frequency current and a rotor or inductor of solid steel made in the shape of a disk designed for maximum strength. The armature winding in the machine of my prior patents is designed for the frequency of the alternating current induced therein and is carried in relatively narrow slots. The purpose of my present invention is to provide a high frequency alternator of the general type described in my prior patents, adapted to generate an alternating current of a frequency corresponding to one of the higher harmonics of the frequency for which the armature winding is designed. In accordance with my present invention, a high frequency alternator can be constructed with an armature winding corresponding to a much lower frequency than the necessary radio frequency, so that relatively wide slots may be used and consequently more space secured for insulation.

I am well aware that machines have heretofore been advocated for directly generating alternating current of radio frequencies in an armature winding designed for lower frequencies. For example, it has been proposed to obtain an alternating current of radio frequencies by generating a current of lower frequency and building up toward a higher frequency by reflex action. And again, other machines have been suggested in which a complex wave form is generated and the circuits arranged in such a way that a higher harmonic can be made use of. All of these systems have the disadvantage of complication and losses incidental to handling and tuning for the currents of lower frequency which are not used. As compared with such prior machines as I am acquainted with, the alternator of my present invention possesses the advantageous feature that the only current generated is that of the desired frequency.

The machine which I have developed for the direct generation of high frequency alternating current in accordance with the principle of my present invention is an inductor alternator of the same general type described in my aforementioned patents. This machine is so constructed that the number of inductor poles opposite any stator tooth is variable. For example, in a triple harmonic machine there are alternately one and two inductor poles opposite each stator tooth. This produces a change in the flux passing through the stator tooth. Generally, machines can be built for any harmonic, for example the $n$th harmonic, by selecting the number of magnetic poles of the inductor in such a way that the number of inductor poles opposite any stator tooth alternates between $$\frac{n+1}{2} \text{ and } \frac{n-1}{2},$$

where $n$ is any odd numeral greater than 1.

The novel features which I believe to be patentably characteristic of my invention are definitely indicated in the claims appended hereto. The construction and mode of operation of a high frequency alternator embodying the features of my present invention will be understood from the following description taken in connection with the accompanying drawings, in which:

Figure 1 is a vertical cross section of the upper half of a high frequency alternator of the type to which my invention particularly relates; Fig. 2 is a diagrammatic developed view of the stator slots and teeth and the inductor poles; Figs. 3 and 4 are detail views; and Figs. 5 and 6 are detail sectional views on the section lines 5—5 and 6—6, respectively, of Fig. 3.

In the drawings, 5 represents the stator frame of the machine into which are screw-threaded a pair of ring-shaped members 6—6. Each of these members carries a circumferentially laminated ring 7 of magnetic material clamped between two rings 8. The laminated rings 7 have opposite faces lying in adjacent radial planes. Between these rings extends the periphery of the rotor which comprises a solid magnetic inductor 9. Two exciting windings or field coils 10 are suitably mounted in the stator of the machine. The magnetic circuit of the exciting windings 10 includes the laminated rings 7, the periphery of the inductor 9, the stator frame 5, and the ring-shaped members 6. The air gaps between the inductor 9 and the laminated rings 7 lie in parallel radial planes. The inductor 9 is slotted near its periphery so as to form magnetic poles. In order to avoid excessive windage at the high speed at which the inductor is designed to operate, the slots in the inductor periphery are filled with solid non-magnetic blocks 11 which may be of brass, or other similar material. The blocks are mounted in the slots in any suitable manner so as to fill the slots flush with the radial sides of the inductor. The slots do not extend to the periphery of the inductor, which is, therefore, left as a continuous ring integral with the rest of the inductor, and thus the blocks 11 are held from displacement by centrifugal force. Ventilating holes 12 are provided in the stator frame opposite the periphery of the inductor.

The armature winding 13 is carried in slots in the faces of the laminated rings 7 adjacent the inductor poles. This armature winding is carried zig-zag through the slots of the laminated ring, as described in my prior Patent No. 1,008,577, and as clearly shown in Fig. 3 of the drawings.

In accordance with the principle of my present invention the widths of the stator teeth and inductor poles are so proportioned that as the inductor rotates the number of rotor poles opposite any stator tooth alternates between $$\frac{n+1}{2} \text{ and } \frac{n-1}{2}.$$

In Figs. 2 and 3, I have diagrammatically illustrated, merely by way of explanation, an arrangement of stator slots and teeth and inductor poles for generating a triple frequency, with respect to the design of the armature winding. The stator has 100 slots while the inductor has 150 magnetic poles. In Fig. 2, the inductor poles are represented at 15 and the stator teeth at 16. It will be evident that the frequency of the induced current is three times what it would be if the inductor poles and the stator teeth had the same width, that is to say if the armature winding were a full pitch winding.

The armature winding of an inductor alternator is usually designed as a substantially full pitch winding, or an equivalent full pitch winding. The frequency, in cycles, of the alternating current induced in such a winding is the product of the inductor poles multiplied by the revolutions per second of the inductor, that is, $f = p.\ s.$ This frequency $(f)$ may be called the normal or fundamental frequency of the armature winding, since it is the frequency which would be normally generated in the winding in the usual inductor alternator, and is hence the frequency for which the armature winding would be designed. If an inductor of the proportions described herein is employed with such an armature winding, the number of inductor poles opposite any stator tooth alternates between $$\frac{n+1}{2} \text{ and } \frac{n-1}{2},$$

where $n$ is any odd numeral greater than 1. The flux in the stator teeth thus changes at a rate represented by, $p.\ s.\ n = nf$. The frequency of the alternating current generated in the armature winding is thus $n$ times the normal or fundamental frequency of the armature winding.

The pole face losses in the inductor due to armature reaction from the high frequency currents in the stator winding are very considerable, and increase as the frequency increases. If a machine is to deliver a large amount of energy the pole face losses must be reduced as much as possible. I have found that this can be accomplished by constructing the inductor in such a way that the filling blocks 11, which are primarily provided for mechanical reasons in order to reduce air friction, serve at the same time as conductors connected together as a squirrel cage winding. For this purpose the blocks 11 should be made of copper or an alloy of high conductivity and connected together at their ends. This can be conveniently done by turning a continuous circumferential groove at the outer and inner ends of the radial slots in the inductor and hammering the material of the filling blocks into these grooves so that a continuous ring of high conductivity is formed at each end of the slots. Preferably, the inductor slots are slightly flared at the radial faces of the inductor so that the magnetic pole faces are slightly narrower than the corresponding intermediate section of magnetic material. This will be best understood by reference to Figs. 3 and 4 of the drawings. The filling blocks when riveted in position form two continuous rings 17 on each side of the inductor, so that a complete short-circuited winding in the nature of a squirrel cage winding, is formed on each radial face of the inductor. In the drawings, the pole faces are represented at 15 and the filling blocks of copper or the like at 11. The currents induced by armature reaction in the short-circuited windings on the radial faces of the inductor produce a magnetization opposing the armature reaction, whereby the pole face losses are minimized.

The slots in the laminated rings 11 should be of the overhung type, as illustrated in Fig. 2 of the drawings. Whenever a high frequency machine is constructed in such a way that the dimensions permit the use of an overhung slot, I consider it of advantage to use the same, because thereby is avoided the eddy current loss in the rotating member which would be due to the slot openings. In a machine of the kind herein described for generating higher harmonics, this feature will be particularly important because the slots are large and the eddy current loss would be considerable, unless the slots are of the overhung type.

What I claim as new and desire to secure by Letters Patent of the United States, is:

1. A high frequency inductor alternator comprising a stator core of laminated magnetic material having slots and teeth, a winding carried in said stator slots, and a rotatably mounted inductor having a plurality of magnetic poles adjacent said winding and separated therefrom by a small air gap, the widths of the stator teeth and rotor poles being such that as the inductor rotates the number of rotor poles opposite any stator tooth alternates between $$\frac{n+1}{2} \text{ and } \frac{n-1}{2},$$

where $n$ is any odd numeral greater than 1.

2. A high frequency alternator comprising a circular stator core of laminated magnetic material having radially positioned slots and teeth, a winding carried in said stator slots, a rotatably mounted inductor having a plurality of magnetic poles adjacent said winding and separated therefrom by a small air gap, the widths of the stator teeth and rotor poles being such that as the inductor rotates the number of rotor poles opposite any stator tooth alternates between $$\frac{n+1}{2} \text{ and } \frac{n-1}{2},$$

where $n$ is any odd numeral greater than 1, and an exciting winding adapted to magnetize said rotor poles.

3. A high frequency alternator comprising a stator carrying a pair of circumferentially laminated rings having opposite faces lying in adjacent radial planes, each of said rings having radially positioned slots and teeth on said opposite faces, a winding carried in the slots of each of said rings, a solid magnetic inductor adapted to be driven at high speed having its periphery extending between said opposite faces and having a plurality of magnetic poles adjacent said windings and separated therefrom by small air gaps, the widths of the stator teeth and rotor poles being such that as the inductor rotates the number of rotor poles opposite any stator tooth alternates between $$\frac{n+1}{2} \text{ and } \frac{n-1}{2},$$

where $n$ is any odd numeral greater than 1, and an exciting winding adapted to magnetize said rotor poles.

4. A high frequency inductor alternator comprising a stator core of laminated magnetic material having slots and teeth, a winding carried in said stator slots, a rotatably mounted inductor having a plurality of magnetic poles adjacent said winding and separated therefrom by a small air gap, the widths of the stator teeth and rotor poles being such that as the inductor rotates the number of rotor poles opposite any stator tooth alternates between $$\frac{n+1}{2} \text{ and } \frac{n-1}{2},$$

where $n$ is any odd numeral greater than one, and a short-circuited winding carried by said inductor for minimizing the effect of armature reaction.

5. A high frequency alternator comprising a circular stator core of laminated magnetic material having radially positioned slots and teeth, a winding carried in said stator slots, a rotatably mounted inductor adapted to be driven at high speed and having a plurality of magnetic poles adjacent said winding and separated therefrom by a small air gap, the widths of the stator teeth and rotor poles being such that as the inductor rotates the number of rotor poles opposite any stator tooth alternates between $$\frac{n+1}{2} \text{ and } \frac{n-1}{2},$$

where $n$ is any odd numeral greater than 1, non-magnetic blocks of high electrical conductivity secured to said inductor between said magnetic poles, and means electrically connecting the ends of said blocks to form a low resistance short-circuited winding for minimizing the effect of armature reaction.

6. A high frequency alternator comprising a stator carrying a pair of circumferentially laminated rings having opposite faces lying in adjacent radial planes, each of said rings having radially positioned slots on said opposite faces, a winding carried in the slots of each of said rings, a solid magnetic inductor adapted to be driven at high speed having its periphery extending between said opposite faces and having approximately radial slots whereby magnetic poles are adapted to be formed between said inductor slots, non-magnetic blocks of high electrical conductivity filling said inductor slots, and means electrically connecting the ends of said blocks to form a low resistance short-circuited winding on each radial surface of said inductor.

7. A high frequency alternator comprising a circular stator core of laminated magnetic material having radially positioned slots, a winding carried in said stator slots, a rotatably mounted inductor adapted to be driven at high speed and having a plurality of magnetic poles adjacent said winding and separated therefrom by a small airgap, non-magnetic blocks of high electrical conductivity secured to said inductor between said magnetic poles, and means electrically connecting the ends of said blocks to form a low resistance short-circuited winding.

8. A high frequency alternator comprising a solid magnetic inductor adapted to be driven at high speed and having approximately radial slots whereby magnetic poles are adapted to be formed between said slots, non-magnetic blocks of high electrical conductivity filling said slots flush with a radial surface of the inductor, means electrically connecting the ends of said blocks to form a low resistance short-circuited winding on a radial surface of the inductor, and a stationary armature winding adjacent the magnetic poles of said inductor and separated therefrom by a small air gap.

9. A high frequency alternator comprising a solid magnetic inductor adapted to be driven at high speed and having approximately radial slots whereby magnetic poles are adapted to be formed between said slots and also having grooves between the ends of the slots, non-magnetic blocks of high electrical conductivity filling said slots and grooves flush with a radial surface of the inductor whereby a low resistance short-circuited winding is formed on such radial surface, and a stationary armature winding adjacent the magnetic poles of said inductor and separated therefrom by a small air gap.

10. A high frequency alternator comprising a solid magnetic inductor adapted to be driven at high speed and having approximately radial slots extending axially through the inductor whereby magnetic poles are adapted to be formed between the slots on both radial faces of the inductor, said inductor having further circumferential grooves connecting the ends of the slots, non-magnetic blocks of high electrical conductivity filling said slots and grooves flush with the radial faces of the inductor whereby a short-circuited winding is formed on each radial face of the inductor, and a stationary winding adjacent the magnetic poles on each radial face of the inductor.

11. A high frequency inductor alternator comprising a stator core of laminated magnetic material having slots and teeth, a winding carried in said stator slots, a rotatably mounted inductor having a plurality of magnetic poles adjacent said winding and separated therefrom by a small air gap, and a low resistance short-circuited winding carried by said inductor.

12. A high frequency alternator comprising a circular stator core of laminated magnetic material having radially positioned slots therein, a winding carried in said stator slots, a rotatably mounted inductor adapted to be driven at high speed and having a plurality of magnetic poles adjacent said winding and separated therefrom by a small air gap, and a low resistance short-circuited winding carried by said inductor.

In witness whereof, I hereunto set my hand this 21st day of June, 1915.

ERNST F. W. ALEXANDERSON.